(12) United States Patent
Saito

(10) Patent No.: US 7,536,931 B2
(45) Date of Patent: May 26, 2009

(54) ARTICULATED ARM

(75) Inventor: Tamotsu Saito, Osaka (JP)

(73) Assignee: Pegasus Sewing Machine Mfg. Co., Ltd., Fukushima-ku, Osaka-shi, Osaka (JP)

( * ) Notice: Subject to any disclaimer, the term of this patent is extended or adjusted under 35 U.S.C. 154(b) by 580 days.

(21) Appl. No.: 11/258,028

(22) Filed: Oct. 26, 2005

(65) Prior Publication Data

US 2006/0086516 A1 Apr. 27, 2006

(30) Foreign Application Priority Data

Oct. 27, 2004 (JP) .............................. 2004-311786
Jul. 29, 2005 (JP) .............................. 2005-219831

(51) Int. Cl.
*B25J 17/00* (2006.01)

(52) U.S. Cl. ...................................... 74/490.05; 901/28

(58) Field of Classification Search .............. 74/490.01, 74/490.03, 490.04, 490.05, 490.06, 490.07; 901/21, 22, 23, 24, 27, 28, 29
See application file for complete search history.

(56) References Cited

U.S. PATENT DOCUMENTS 5,740,699 A * 4/1998 Ballantyne et al. ....... 74/490.06
5,816,769 A 10/1998 Bauer et al.
6,431,019 B1 * 8/2002 Greene et al. ............ 74/490.05
6,477,912 B2 * 11/2002 Song et al. ............... 74/490.06
2004/0195988 A1 10/2004 Buckingham

FOREIGN PATENT DOCUMENTS

FR 2 638 387 5/1990
JP H7-80145 7/1988

* cited by examiner

*Primary Examiner*—Richard W L Ridley
*Assistant Examiner*—James Pilkington
(74) *Attorney, Agent, or Firm*—Bacon & Thomas, PLLC

(57) ABSTRACT

An articulated arm having a first arm member and a second arm member flexibly coupled mutually by a ball joint. From a plurality of through-holes provided in the first arm member 2 to a plurality of holding holes provided in the second arm member, compression coil springs 8 are inserted. Support shafts are inserted, movably back and forth freely, in the through-holes behind the rear end portion of the compression coil springs. A certain support shaft is moved forward by actuator or the like to push the compression coil spring while other support shaft are moved backward. As a result, the second arm member can be moved to a specified position by the ball joint. Stopping state of the second arm member at the specified position is maintained by the balance of position of support shaft and repulsive force of compression coil spring.

12 Claims, 8 Drawing Sheets

ARTICULATED ARM

BACKGROUND OF THE INVENTION

1. Field of the Invention

The present invention relates to an articulated arm.

2. Explanation of Related Art

This kind of articulated arm for manipulator is shown, for example, in FIG. 10 (see, for example, Japanese Patent Publication H7-80145). The articulated arm shown in FIG. 10 comprises an elastic shrinking element (actuator) 23 of three members single-unit supported between a first arm member 21 and a second arm member 22 coupled by a ball joint 20. The ball joint 20 is composed of a socket 20a having a hemispherical recess, and a ball 20b freely rolling and fitting in this recess. The elastic shrinking element 23 is expanded in diameter and deformed when a pressurizing fluid is supplied from a pressure supply source not shown, so as to shrink in the longitudinal direction. Each elastic shrinking element 23 is coupled to the first arm member 21 at one end, and to the second arm member 22 at other end. For their coupling, one end of each elastic shrinking element 23 is coupled to a mounting member 24 affixed to the first arm member 21 by a wire 25a, and other end is coupled to the second arm member 22 by a wire 25b. Pressurizing fluid is supplied or discharged in the elastic shrinking element 23 to apply tension to each wire 25b, and the second arm member 22 is moved to the first arm member 21 by way of the ball joint 20. When the second arm member 22 is moved to a specified position, a negative pressure is applied to the gap between the inner side of the socket 20a and the ball 20b by a pressurizing fluid supply and discharge device 26, and the second arm member 22 is stopped and held at this position.

Therefore, in the conventional articulated arm, holding of the second arm member 22 at specified stopping position is achieved by the balance of tension of all of the plurality of wires 25b, but when the second arm member 22 unexpectedly hits against an object (obstacle), the elastic shrinking element 23 or the object may be damaged or broken by this impact.

Also, to supply or discharge pressurizing fluid in the elastic shrinking element (actuator) 23, a pressurizing fluid supply and discharge device is needed. Further, to stop and hold the second arm member 22 at specified position after moving to the first arm member 21, a pressurizing fluid supply and discharge device 26 is needed for applying a negative pressure in the gap between the inner side of the socket 20a and the ball 20b, and hence the entire structure is somewhat complicated.

SUMMARY OF THE INVENTION

The present invention is devised to solve these problems, and it is hence an object thereof to provide an articulated arm simple in structure, capable of preventing damage of object by disposing an elastic element for absorbing or lessening the impact between a first arm member and a second arm member, in an articulated arm having a first arm member and a second arm member flexibly coupled mutually by way of a joint.

The present invention comprises a first arm member and a second arm member flexibly coupled mutually by way of a joint. The first arm member has a plurality of through-holes provided in the longitudinal direction. At one end of the second arm member opposite to the first arm member, a plurality of holding holes are provided so as to face the through-holes. A plurality of elastic elements are inserted into the holding holes at the leading end side, and into the through-holes at the rear end side. A plurality of support shafts are inserted, movably back and forth freely, in the through-holes behind the rear end portion of the elastic elements.

It is a main feature of the present invention that a certain support shaft out of a plurality of support shafts moves forward to push the elastic element to the direction of second arm member, and other support shaft moves backward corresponding to the second arm member pushed by the advancing elastic element and flexed through the joint, and thereby the elastic element moves backward.

Preferably, in the articulated arm of the present invention, the plurality of through-holes is disposed concentrically as basing the position of the joint. The elastic element may be a combination coil spring consisting of an outside coil spring and an inside coil spring disposed inside of the outside coil spring.

Said articulated arm may also have actuators for moving the support shafts forward and backward. Each actuator includes a drive motor rotating normally and reversely, a screw shaft fixed on the motor shaft of the drive motor, and a nut engaged with the screw shaft. The nut is disposed in a turn stopping state behind the rear end portion of the support shaft, so that the support shaft may move forward or backward along with forward or backward move of the nut by rotation of the screw shaft. In the articulated arm, further, the support shafts inserted in the through-holes should be moved forward or backward all at once.

According to the articulated arm having such configuration, by moving the elastic element by moving the support shaft forward or backward, the second arm member may be flexed from the first arm member about the joint. When the second arm member is flexed to a specified position, forward or backward move of each support shaft is stopped, and the second arm member is stopped and held at this position by the balance between position of each support shaft and repulsive force of the elastic element. That is, by the position of each support shaft and repulsive force of the elastic element, three-dimensional position or two-dimensional position can be controlled on the joint of the second arm member.

At this time, if the second arm member hits against an object, this impact can be absorbed or lessened by the elasticity of the elastic element, and damage or breakage of the object can be prevented.

By using the combination coil spring composed of outside coil spring and inside coil spring as the elastic element, it is deflected smoothly by a specified spring constant, and the second arm member can be moved smoothly and securely transferred to a specified position.

When all support shafts are moved forward at once by a specified extent and all elastic elements are compressed, absorption relaxation of impact of the second arm member hitting against an object can be decreased. To the contrary, when all support shafts are moved backward at once by a specified extent and all elastic elements are expanded, absorption relaxation of impact of the second arm member hitting against an object can be increased. As a result, damage of the object can be prevented more securely.

As the actuator for moving each support shaft forward or backward, by using a drive motor, a screw shaft, and a nut, after the second arm member is flexed by driving of the drive motor, when the drive motor is stopped, a state flexed by a specified angle is maintained in the specified direction of the second arm member. Therefore, the structure is simple as compared with the conventional actuator 23 (articulated arm in FIG. 10) which requires the pressurizing fluid supply and discharge device for supplying and discharging pressurizing fluid in the elastic shrinking element 23, and pressurizing fluid supply and discharge device 26 for stopping and holding at specified position after moving the second arm member 22 from the first arm member 21 to the specified position.

DESCRIPTION OF THE PREFERRED EMBODIMENTS

Figure 2:
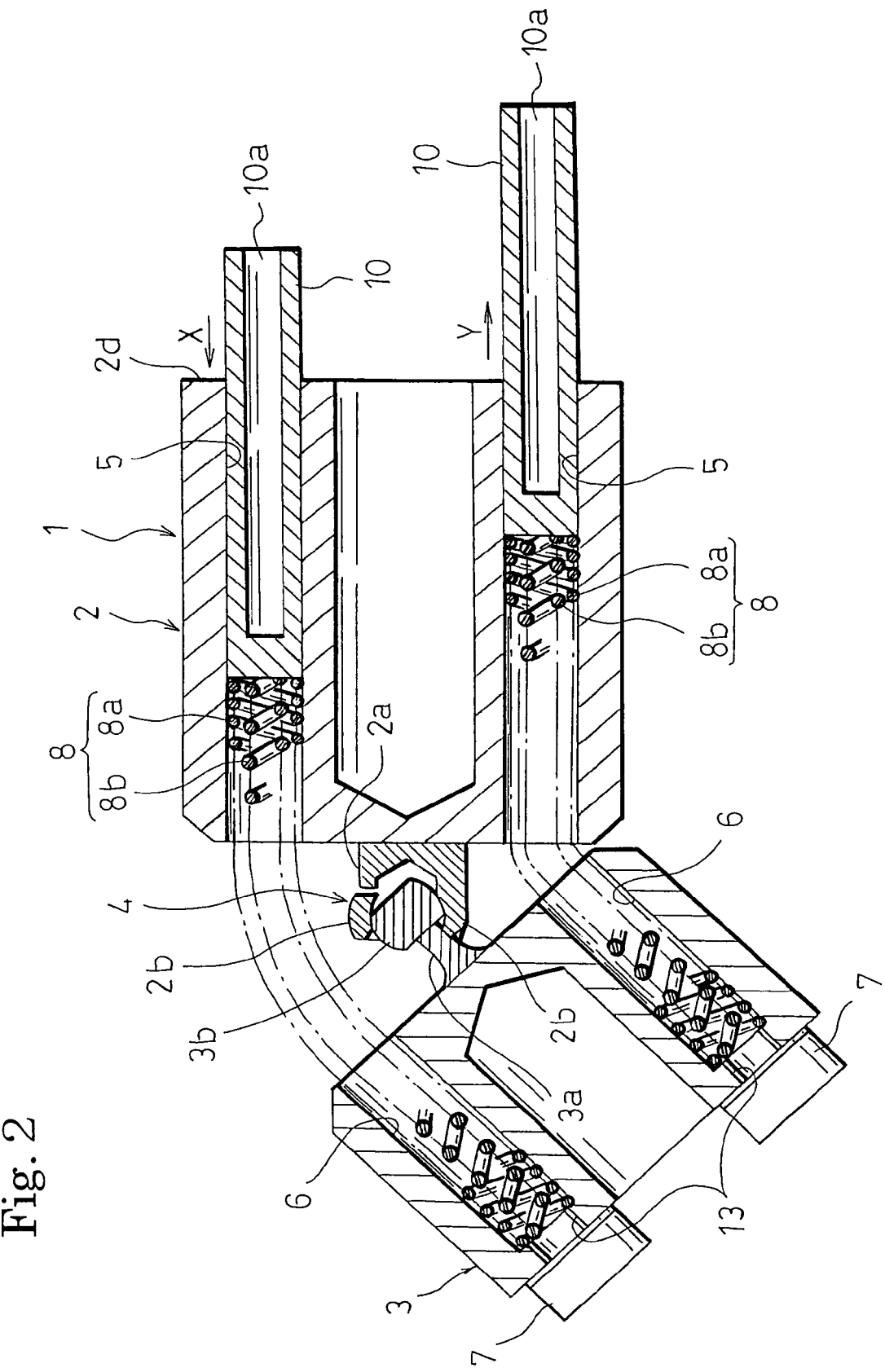
FIG. 2 is a motion explanatory diagram of the articulated arm.
Figure 3:
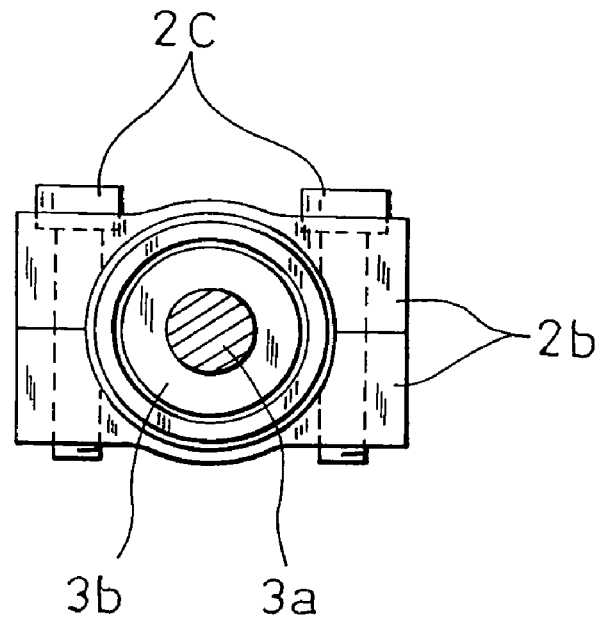
FIG. 3 is a schematic side view of ball joint of the articulated arm.
Figure 4:
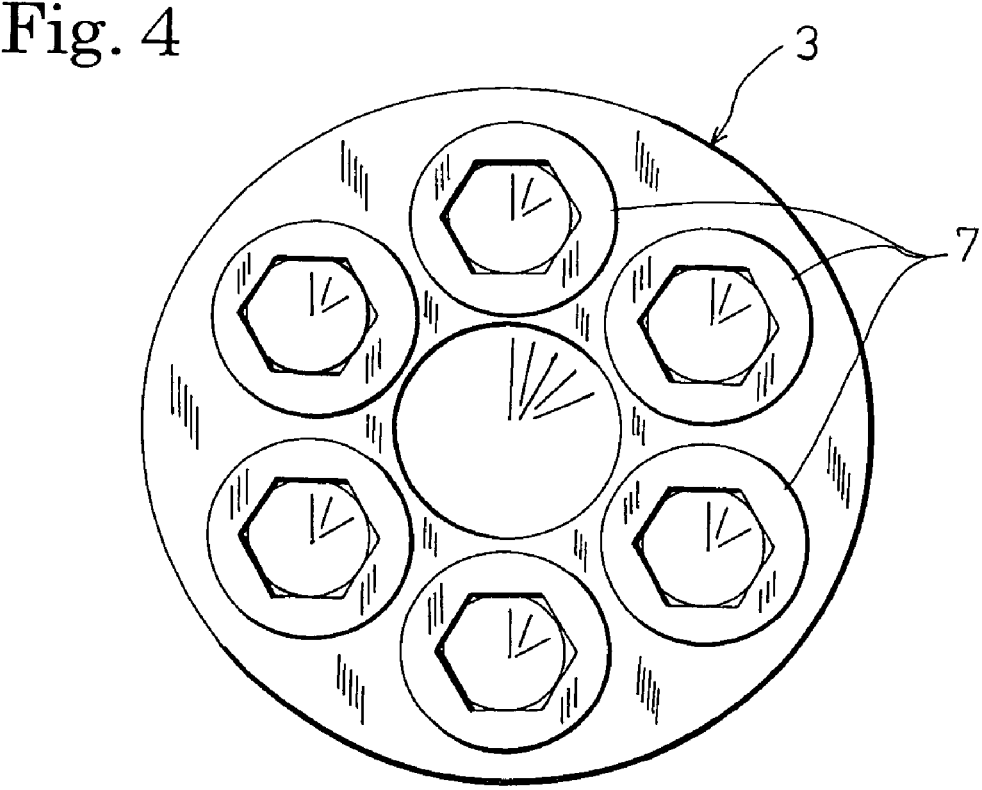
FIG. 4 is a front view of second arm member of the articulated arm.
Figure 5:
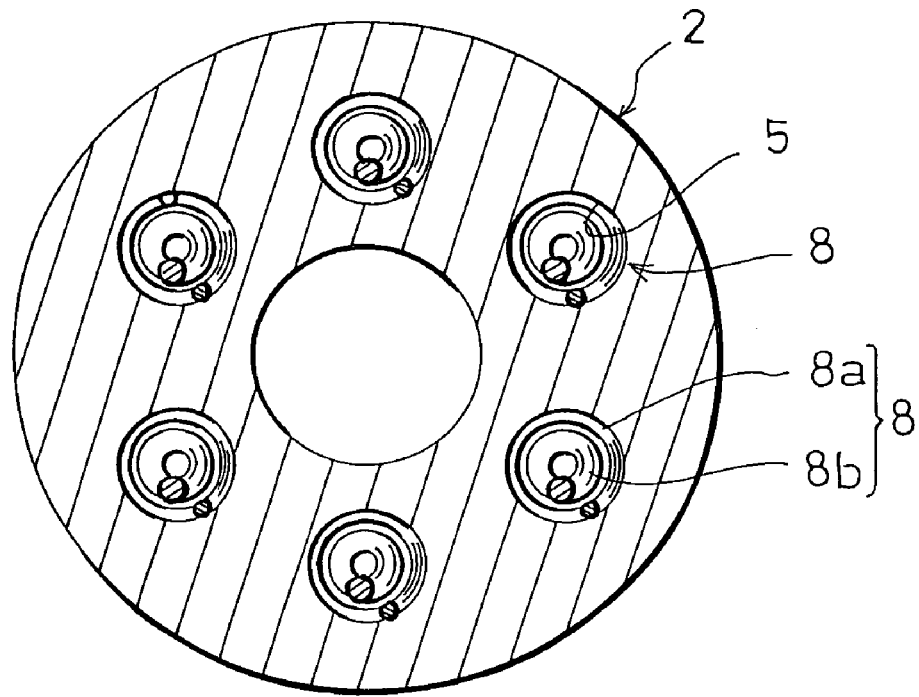
FIG. 5 is a sectional view of A-A line in FIG. 1.
Figure 6:
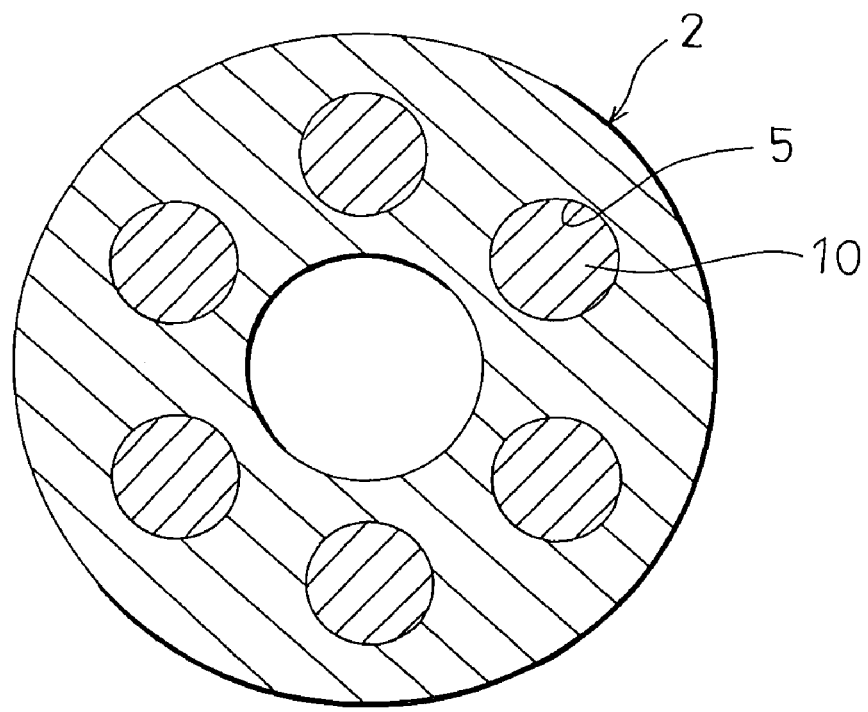
FIG. 6 is a sectional view of B-B line in FIG. 1.

A preferred embodiment of the present invention is described below while referring to the accompanying drawings. In FIG. 1 to FIG. 6, an articulated arm 1 has a first arm member 2 and a second arm member 3. The first arm member and second arm member are coupled to each other flexibly, by way of a ball joint 4 provided between central parts of the mutually opposing ends of the both members 2 and 3. The ball joint 4 has a spherical sliding bearing, and the spherical sliding bearing is composed of two split outer rings 2b, 2b attached to a protruding piece 2a of the first arm member 2, and a spherical inner ring 3b assembled in a stud 3a of the second arm member 3. The two split outer rings 2b, 2b are fixed by screws 2c, 2c disposed at both ends as shown in FIG. 3.

The first arm member 2 has a plurality of (six in the shown example) through-holes 5 pierced in parallel along the longitudinal direction of the first arm member 2. The through-holes 5 are disposed at equal intervals concentrically as basing the position of the ball joint 4.

At one end face of the second arm member 3 opposite to the first arm member 2, a plurality of (six in the shown example) holding holes 6 are provided. The holding holes 6 are opposite to the corresponding through-holes 5, and same in diameter as the through-holes 5. The plurality of holding holes 6 are blind holes in the longitudinal direction of the second arm member 3. Screw holes 13 are formed in the blind wall at the leading end side of the holding holes 6, and screws 7 are driven in these screw holes 13.

From the through-holes 5 of the first arm member 2 to the holding holes 6 of the second arm member 3, elastic elements 8 such as compression coil springs are inserted. The elastic element 8 such as compression coil spring is a combination coil spring consisting of an outside coil spring 8a and an inside coil spring 8b. The outside coil spring 8a has a diameter nearly same as inside diameter of through-holes 5 and holding holes 6. The inside coil spring 8b is disposed concentrically inside the outside coil spring 8a, and has a smaller outside diameter than the inside diameter of the outside coil spring 8a. The inside coil spring 8b has a wire diameter and a pitch larger than the wire diameter and pitch of the outside coil spring 8a, and its spring constant is larger than that of the outside coil spring 8a. The leading end side of the elastic element 8 is inserted into the holding hole 6, and the rear end side of the elastic element 8 is inserted into the through-hole 5.

Behind the rear end portion of the elastic element 8 in each through-hole 5 of the first arm member 2, a support shaft 10 is inserted movably forward and backward, and the leading end of the support shaft 10 abuts against the rear end portion of the elastic element 8. With the leading end of the support shaft 10 in contact with the rear end portion of the elastic element 8, the leading end portion of the elastic element 8 is abutting against the leading end of the screw 7 at the leading end side of the holding hole. The support shafts 10 are moved forward or backward in the through-holes 5 as the actuators 14 (see FIG. 7 to FIG. 9) provided at rear end sides are driven by signals from control units (not shown). By the forward or backward movement of the support shaft 10, the elastic element 8 is pressed to the direction of the second arm member 3.

Figure 7:
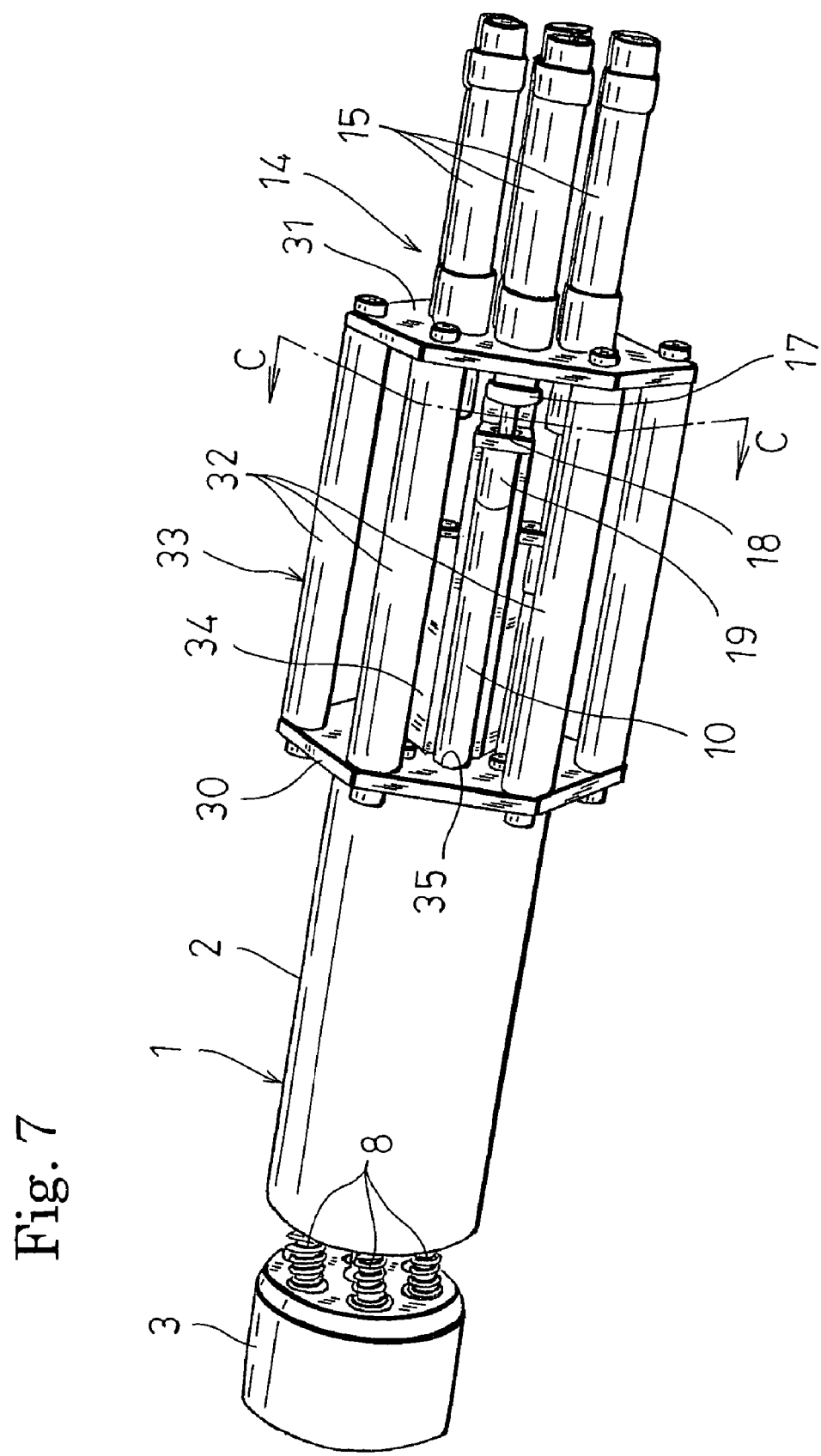
FIG. 7 is a perspective outline view in a state of providing the articulated arm in FIG. 1 with an actuator.
Figure 8:
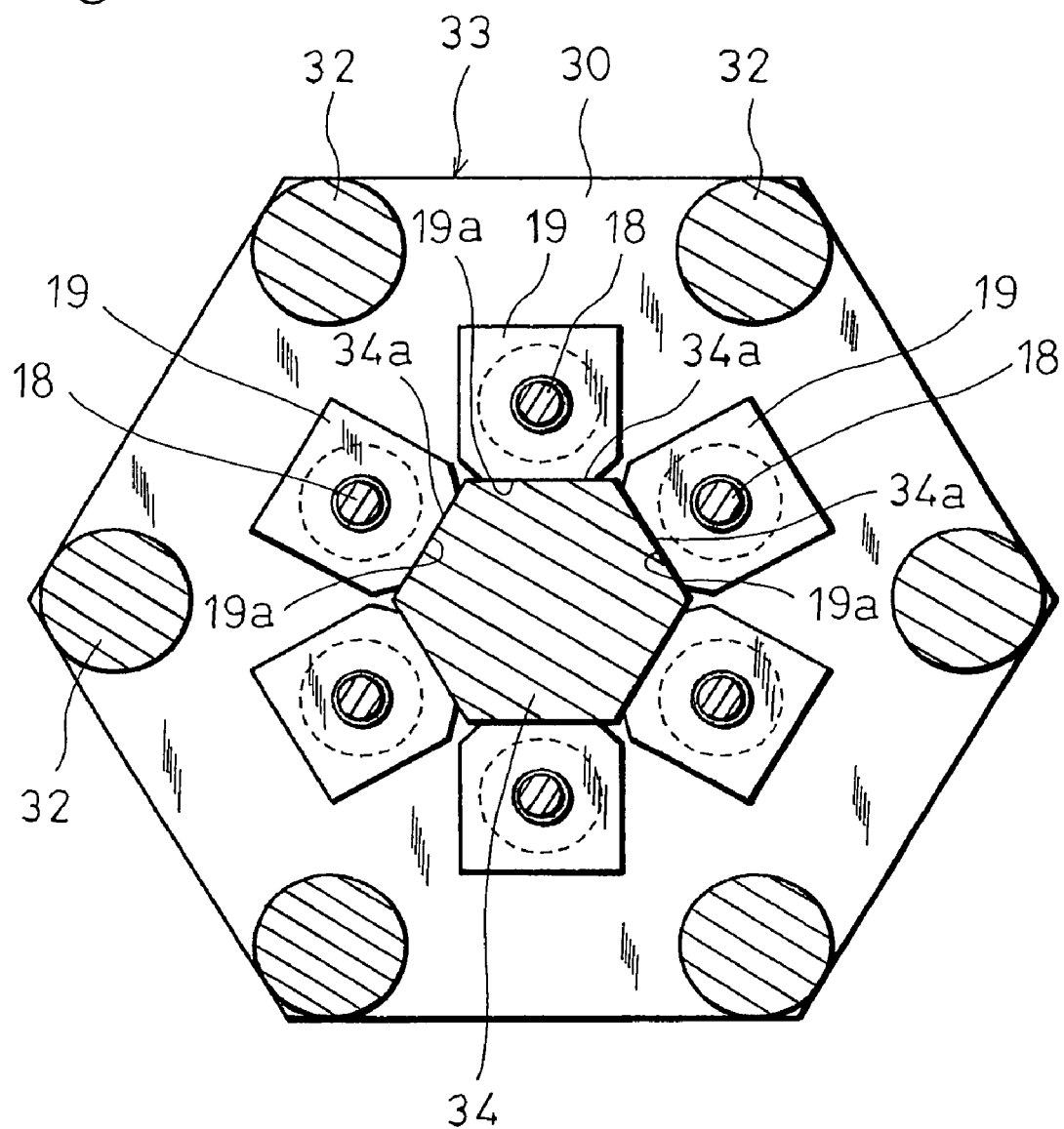
FIG. 8 is a sectional view of C-C line in FIG. 7.
Figure 9:
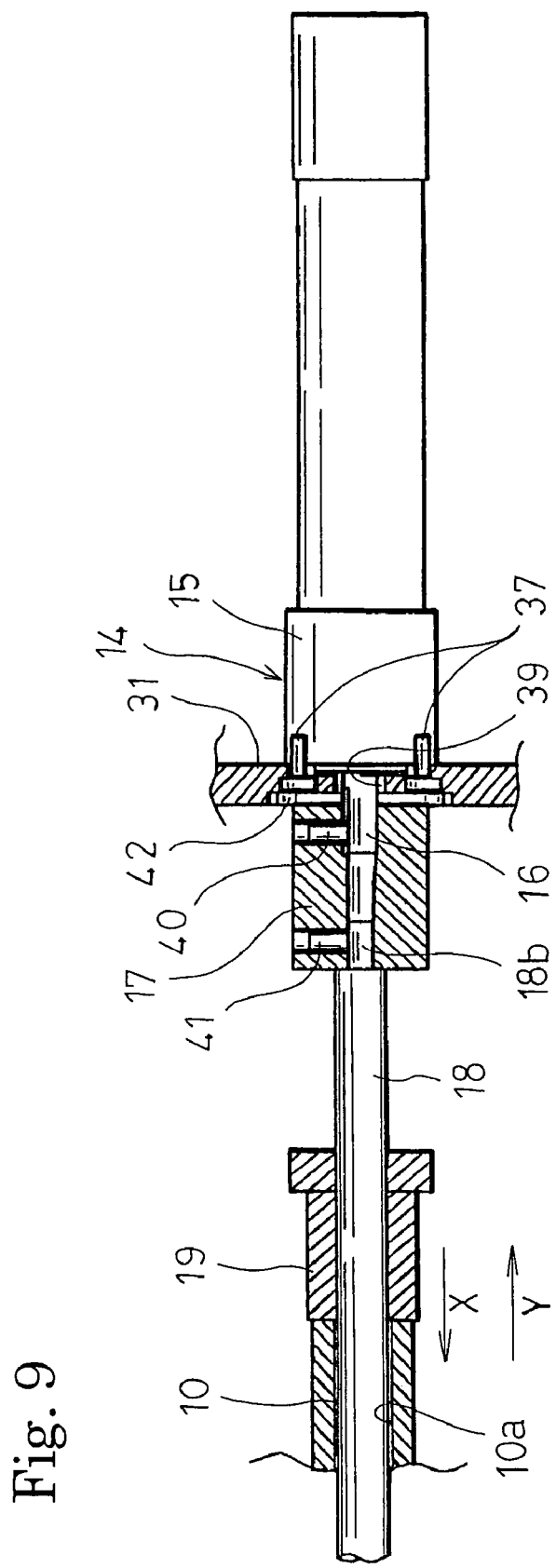
FIG. 9 is a sectional view of junction between actuator and support shaft in the articulated arm.
Figure 10:
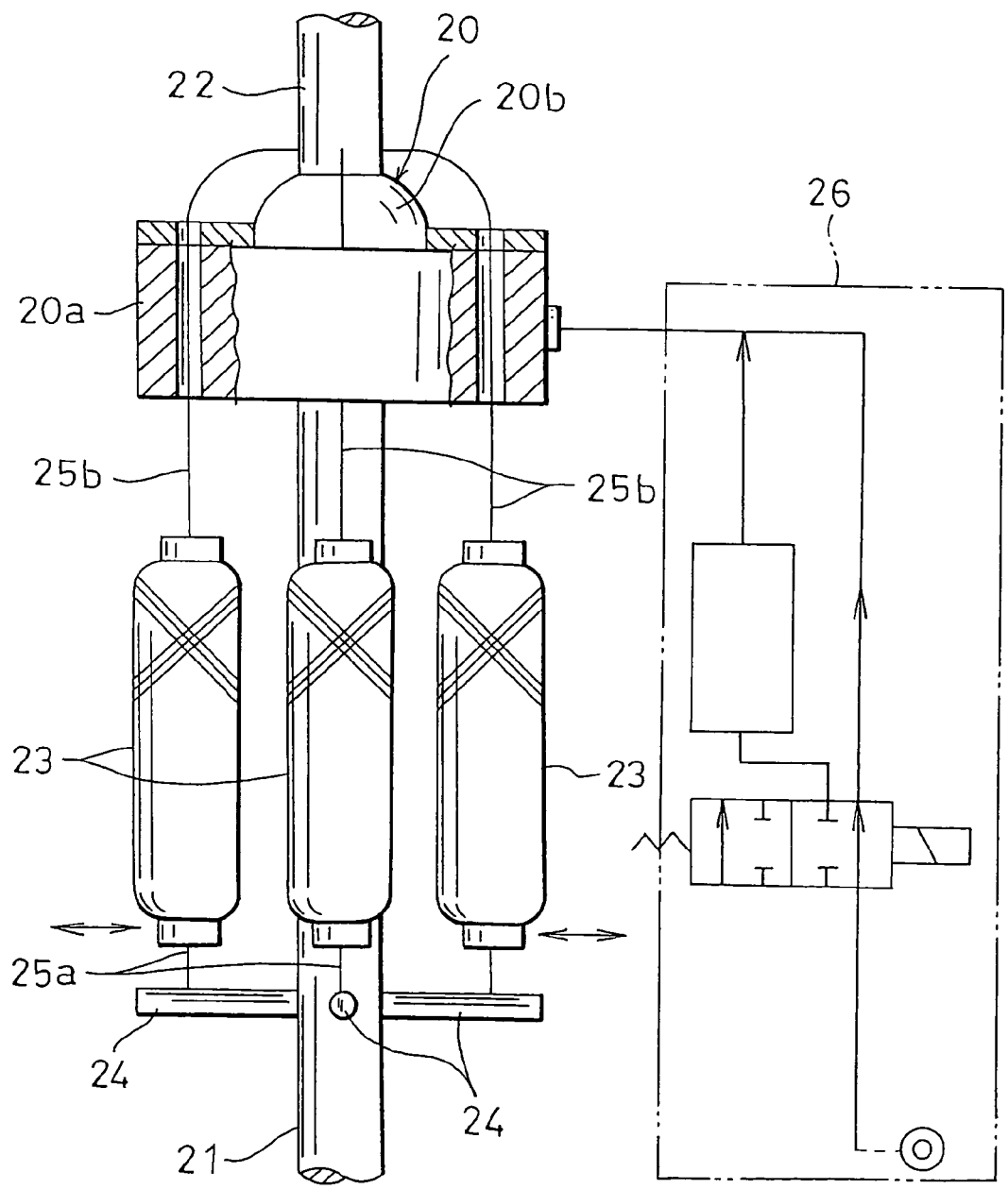
FIG. 10 is a schematic block diagram of a conventional articulated arm.

A specific example of actuator 14 is explained by referring to FIG. 7 through FIG. 9. The actuator 14 comprises a drive motor 15 rotating normally and reversely, a screw shaft 18 such as ball screw shaft, and a nut 19 such as ball screw nut. The screw shaft 18 is coupled to a motor shaft 16 of the drive motor 15 through a tubular coupling 17, and the nut 19 is engaged with the screw shaft 18. The support shaft 10 has a larger inside diameter than the outside diameter of the screw shaft 18, and is formed in a hollow shape having a hollow part 10a opened in the rear side. The leading end side of the screw shaft 18 is freely inserted into the hollow part 10a. The support shaft 10 and nut 19 adjoin in mutually free state.

The actuator 14 is supported by a mounting member 33. The mounting member 33 has a pair of front and rear fixing plates 30, 31 opposite to each other, and said fixing plates 30, 31 are coupled integrally by a plurality of parallel tie rods 32. The central parts of the fixing plates 30, 31 are integrally coupled a nut locking rod 34. Around the nut locking rod 34 of the front side fixing plate 30, a plurality of through-holes 35 for support shafts are arranged, and a plurality of support shafts 10 protruding backward from the rear end face 2d of the first arm member 2 are individually penetrating into the through-holes 35. As shown in FIG. 8, the nut locking rod 34 is formed in a polygonal section having sides 34a as many as the number of support shafts 10.

As shown in FIG. 7, the front side fixing plate 30 is integrally fitted to the rear end side 2d of the first arm member 2. As shown in FIG. 7 and FIG. 9, in the rear side fixing plate 31, drive motors 15 as many as the number of support shafts 10 are fixed by setting screws 37. The motor shaft 16 of each drive motor 15 protrudes to the front side of the fixing plate 31 from the motor shaft through-hole 39 provided in the fixing plate 31, and is connected to the rear end portion 18b of each ball screw shaft 18 by tubular coupling 17. That is, the motor shaft 16, rear end portion 18b of screw shaft 18, and coupling 17 are respectively fixed by screws 40, 41. Or, as shown in FIG. 9, a washer 42 is placed between the fixing plate 31 and coupling 17, and the motor shaft 16 of the drive motor 15 is inserted into the central hole of the washer 42. Hence, the coupling 17 and the setting screw 37 do not interfere with each other.

The nut 19 is disposed on each screw shaft 18 protruding backward from the rear end portion of each support shaft 10. One end of the nut 19 is formed in a polygonal shape on its outer circumference as shown in FIG. 8, and one side 19a contacts flatly with the side 34a (polygonal section) of the nut locking rod 34, so as to keep in a turn stopping state. As a result, the plurality of nuts 19 does not turn by one nut locking rod 34.

Driving of actuator 14 is explained. When the motor shaft 16 rotates counterclockwise by driving of the drive motor 15, the coupling 17 and screw shaft 18 rotate in the same direction, and the nut 19 advances in the direction of arrow X. At this time, the support shaft 10 is pushed by the advancing nut 19, and moves forward.

When the motor shaft 16 rotates clockwise by driving of the drive motor 15, the coupling 17 and screw shaft 18 rotate in the same direction, and the nut 19 retreats in the direction of arrow Y, a retreating space for the support shaft 10 is provided. At this time, when the second arm member 3 is flexed through the ball joint 4, the support shaft 10 moves backward as the elastic element 8 of the flexed side retreats.

The motion of the articulated arm 1 having such configuration is explained.

Figure 1:
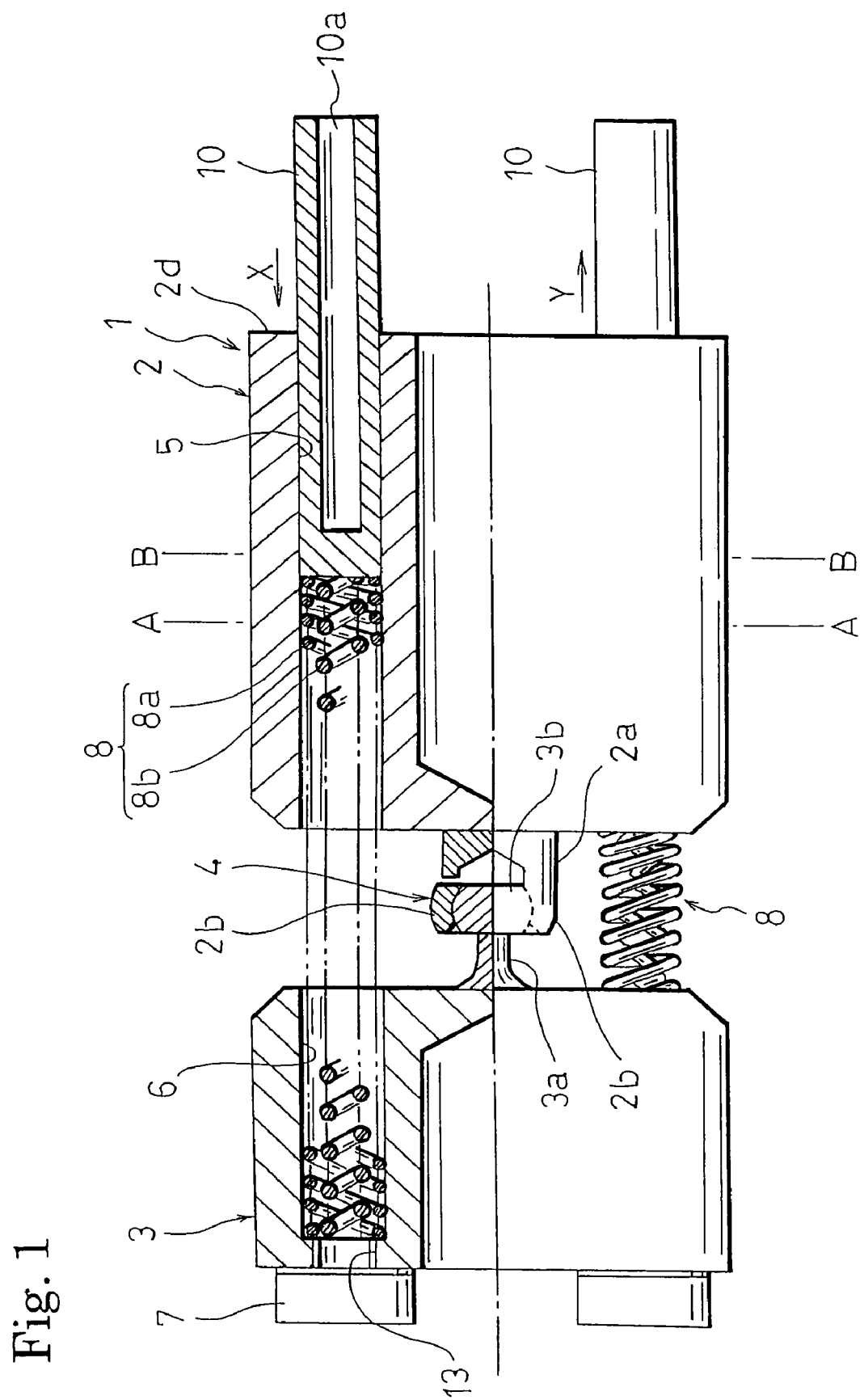
FIG. 1 is a half cut-away sectional view of articulated arm in an embodiment according to the present invention.

In FIG. 1, suppose that the upper side support shaft 10 advances in the direction of arrow X to push the elastic element 8 by driving of the actuator 14 of the upper side support shaft 10, and that the lower side support shaft 10 retreats in the direction of arrow Y to fill up the space corresponding to the moving distance of the upper side support shaft 10 by driving of the actuator 14 of the lower side support shaft 10. As a result, as shown in FIG. 2, the second arm member 3 can be moved to a specified position through the ball joint 4. When moving to this position, out of six support shafts 10 shown in FIG. 6, three adjacent support shafts 10 may be moved forward. Other three support shafts 10 are properly moved backward at this time.

When the second arm member 3 moves to the specified position, motion of the support shafts 10 is stopped, and the second arm member 3 can be stopped and held at this position by the balance between position of each support shaft 10 and repulsive force of the elastic element 8. Thus, by the position of each support shaft 10 and repulsive force of the elastic element 8, three-dimensional position of the second arm member 3 can be controlled on the ball joint 4 of free joint.

While the second arm member 3 is moving, unexpectedly, if the second arm member 3 hits against an object, this impact can be absorbed or lessened by the elasticity of the elastic element 8. As a result, damage or breakage of object such as actuator 14 or support shaft 10 can be alleviated.

By using the drive motor 15, screw shaft 18 and nut 19 as the actuator 14, after flexing the second arm member 3 by driving of the drive motor 15, when the drive motor 15 is stopped, the second arm member 3 is maintained in a flexed state by specified angle in the specified direction.

When all support shafts 10 are moved forward at once by a specified extent in the direction of arrow X and all elastic elements are compressed, absorption relaxation of impact of the second arm member hitting against an object can be decreased. To the contrary, when all support shafts 10 are moved backward at once by a specified extent in the direction of arrow Y and all elastic elements 8 are expanded, absorption relaxation of impact of the second arm member hitting against an object can be increased. As a result, damage of the object can be prevented more securely. Meanwhile, if the simultaneous forward or backward move of the support shafts 10 is done preliminarily, the desired impact relaxation can be adjusted as the articulated arm 1 before the second arm member hits against an object. Incidentally, when the support shafts 10 are moved at once forward or backward, the second arm member 3 should not be moved through the ball joint 4.

When the first arm member 2 and second arm member 3 are both used in horizontal state, the second arm member 3 may sink by its own weight. In this case, by moving forward only the sinking side support shaft 10 in the direction of arrow X to compress the elastic element 8, the second arm member 3 can be held in the horizontal state by overcoming its own weight.

In this embodiment, the support shaft 10 and nut 19 are mutually free and are not coupled integrally, but the nut 19 may be integrally formed at the rear end of the support shaft 10.

As the joint for coupling the first arm member 2 and second arm member 3, the free joint such as the ball joint 4 capable of flexing vertically and longitudinally is used for controlling the three-dimensional position of the second arm member 3, but it is not limited. Other joint for coupling the both members 2, 3 may be also realized by an elbow joint capable of flexing only vertically or longitudinally so as to control the two-dimensional position of the second arm member 3. The basic construction of the elbow joint is specified in JIS T 9219 or JIS T 9220.

What is claimed is:

1. An articulated arm comprising:
   a first arm member and a second arm member flexibly coupled mutually by a joint,
   a plurality of through-holes provided in the first arm member in the longitudinal direction,
   a plurality of holding holes provided at one end of the second arm member facing the first arm member so as to face the through-holes,
   a plurality of elastic elements inserted into the holding holes at the leading end side of the elastic elements, and into the through-holes the rear end side of the elastic elements,
   said plurality of elastic elements each defining a rear end portion, and
   a plurality of support shafts inserted, to be selectively movable back and forth, in the through-holes behind said rear end portion of the elastic elements, in which a certain support shaft out of the plurality of support shafts moves forward to push the elastic element toward the second arm member, and another support shaft moves backward corresponding to the second arm member pushed by the advancing elastic element and flexed through the joint, and thereby the elastic element moves backward.

2. The articulated arm as claimed in claim 1, wherein the plurality of through-holes are disposed concentrically around the position of the joint.

3. The articulated arm as claimed in claim 2, wherein the elastic element is a combination coil spring consisting of an outside coil spring and an inside coil spring disposed inside of said outside coil spring.

4. The articulated arm as claimed in claim 3, further comprising actuators for moving the support shafts forward and backward.

5. The articulated arm as claimed in claim 4, wherein each support shaft defines a rear end portion, and each actuator includes a drive motor rotatable in a forward and reverse direction a screw shaft fixed on the motor shaft of the drive motor, and a nut engaged with the screw shaft, said nut is disposed so as not to rotate in abutting contact with a nut locking rod behind said rear end portion of the support shaft, so that the support shaft moves forward or backward along with forward or backward movement of the nut by rotation of the screw shaft.

6. The articulated arm as claimed in claim 2, further comprising actuators for moving the support shafts forward and backward.

7. The articulated arm as claimed in claim 6, wherein each support shaft defines a rear end portion, and each actuator includes a drive motor rotatable in a forward and reverse direction a screw shaft fixed on the motor shaft of the drive motor, and a nut engaged with the screw shaft, said nut is disposed so as not to rotate in abutting contact with a nut locking rod behind said rear end portion of the support shaft, so that the support shaft moves forward or backward along with forward or backward movement of the nut by rotation of the screw shaft.

8. The articulated arm as claimed in claim 1, wherein the elastic element is a combination coil spring consisting of an outside coil spring and an inside coil spring disposed inside of said outside coil spring.

9. The articulated arm as claimed in claim 8, further comprising actuators for moving the support shafts forward and backward.

10. The articulated arm as claimed in claim 9, wherein each support shaft defines a rear end portion, and each actuator includes a drive motor rotatable in a forward and reverse direction a screw shaft fixed on the motor shaft of the drive motor, and a nut engaged with the screw shaft, said nut is disposed so as not to rotate in abutting contact with a nut locking rod behind said rear end portion of the support shaft, so that the support shaft moves forward or backward along with forward or backward movement of the nut by rotation of the screw shaft.

11. The articulated arm as claimed in claim 1, further comprising actuators for moving the support shafts forward and backward.

12. The articulated arm as claimed in claim 11, wherein each support shaft defines a rear end portion, and each actuator includes a drive motor rotatable in a forward and reverse direction, a screw shaft fixed on the motor shaft of the drive motor, and a nut engaged with the screw shaft, said nut is disposed so as not to rotate in abutting contact with a nut locking rod behind said rear end portion of the support shaft, so that the support shaft moves forward or backward along with forward or backward movement of the nut by rotation of the screw shaft.

\* \* \* \* \*